(12) United States Patent
Volanek et al.

(10) Patent No.: US 9,132,757 B2
(45) Date of Patent: Sep. 15, 2015

(54) VEHICLE SEAT COMPRISING A HEAD RESTRAINT

(75) Inventors: Peter Volanek, Dubnica nad Vahom (SK); John McKenna, Maldon Essex (SK); Ivan Jakubec, Trnava (SK); Radovan Oska, Vrbove (SK); Jan Stransky, Banove n. B. (SK)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 13/819,324

(22) PCT Filed: Sep. 2, 2011

(86) PCT No.: PCT/EP2011/065181
§ 371 (c)(1),
(2), (4) Date: Jul. 11, 2013

(87) PCT Pub. No.: WO2012/028711
PCT Pub. Date: Mar. 8, 2012

(65) Prior Publication Data
US 2014/0159438 A1 Jun. 12, 2014

(30) Foreign Application Priority Data
Sep. 3, 2010 (DE) .......................... 10 2010 044 357

(51) Int. Cl.
*B60N 2/48* (2006.01)
(52) U.S. Cl.
CPC .............. *B60N 2/487* (2013.01); *B60N 2/4832* (2013.01); *B60N 2/4885* (2013.01); *B60N 2002/4891* (2013.01)

(58) Field of Classification Search
CPC ..... B60N 2/487; B60N 2/4832; B60N 2/4885
USPC ........................................... 297/61, 403, 410
See application file for complete search history.

(56) References Cited

U.S. PATENT DOCUMENTS 7,121,625 B2 * 10/2006 Malsch et al. ................ 297/410
2004/0160107 A1 8/2004 Steinle et al.
(Continued)

FOREIGN PATENT DOCUMENTS

| DE | 102004022155 B3 | 7/2005 |
| DE | 102004034158 A1 | 8/2005 |
| DE | 102004040882 B3 | 9/2005 |

(Continued)

OTHER PUBLICATIONS

National Highway and Traffic Safety Administration: Federal Motor Vehicle Safety Standards; Head Restraints; Final Rule; 49 CFR Part 571; Dec. 14, 2004, vol. 69, No. 239, pp. 74848-74891.

(Continued)

*Primary Examiner* — Anthony D Barfield
(74) *Attorney, Agent, or Firm* — Fletcher Yoder, P.C.

(57) ABSTRACT

In a vehicle seat comprising a head restraint and a seat back, the head restraint can be moved between a usage position and a non-usage position. According to the invention, at least one interfering element is pivotably mounted inside the seat back by means of a pivoting device, wherein in the non-usage position the head restraint positions the at least one interfering element of the seat back in such a way that the interfering element forms at least one contact point with the torso of a vehicle occupant located on the vehicle seat.

7 Claims, 3 Drawing Sheets

(56) References Cited

U.S. PATENT DOCUMENTS

Figure 1:
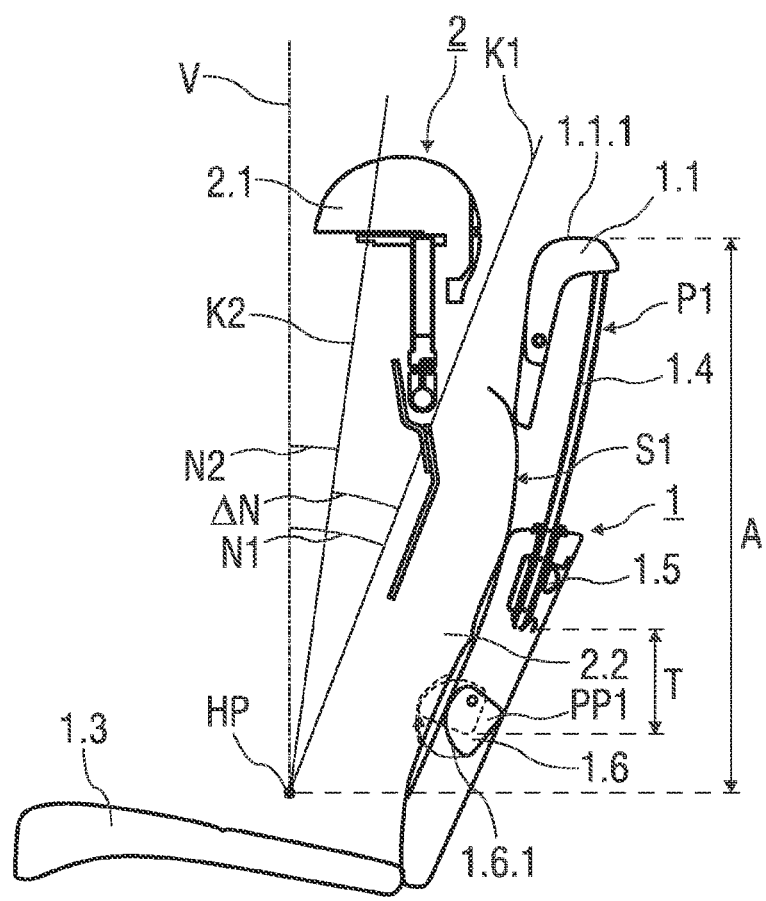

| | | |
|---|---|---|
| 2006/0163927 A1 | 7/2006 | Steinle et al. |
| 2010/0013275 A1* | 1/2010 | Yokota et al. ............ 297/61 X |

FOREIGN PATENT DOCUMENTS

| | | |
|---|---|---|
| DE | 102004040883 B3 | 9/2005 |
| DE | 102004018964 B3 | 12/2005 |
| DE | 102004022158 A | 12/2005 |
| DE | 102004027385 A1 | 12/2005 |
| DE | 102006003881 A1 | 8/2007 |
| EP | 1447265 A1 | 8/2004 |
| JP | S63099553 U | 6/1988 |
| JP | 2009179218 | 8/2013 |
| WO | 2005065992 A1 | 7/2005 |

OTHER PUBLICATIONS

International Search Report for application No. PCT/EP2011/065181 mailed Mar. 21, 2012.
1st Office Action issued for DE102010044357.3; Mar. 1, 2011, 3 pgs.
Japanese Office Action mailed May 27, 2014.
Korean Office Action mailed Sep. 26, 2014 for Application No. 10-2013-7008073.
European Office Action dated Apr. 11, 2014.

* cited by examiner

VEHICLE SEAT COMPRISING A HEAD RESTRAINT

CROSS REFERENCE TO RELATED APPLICATIONS

This application claims priority from and the benefit of PCT Application No. PCT/EP2011/065181, filed on Sep. 2, 2011; and German Patent DE 10 2010 044 357.3, filed on Sep. 3, 2010; both entitled "Vehicle Seat Comprising a Head Restraint", which are herein incorporated by reference.

BACKGROUND

The invention relates to a vehicle seat comprising a head restraint according to the preamble of claim 1.

Prior art generally discloses vehicle seats which comprise a height-adjustable head restraint and which enable a vehicle occupant located on the vehicle seat to rest their head against the head restraint when the seat back is in a vertical or moderately reclined position. Usually, such head restraints are adjustable manually, or automatically by means of a positioning unit. The head restraint affords the vehicle occupant a comfortable sitting position during travel. Moreover, the head restraint serves to prevent injuries to the vehicle occupant in the event of an accident.

Injuries due to whiplash are particularly preventable by means of a correctly positioned and locked head restraint. For this reason a safety standard FMVSS 202a was introduced in the USA according to which a head restraint tilts a characteristic line defined by a sitting position of the vehicle occupant by at least 10 degrees in the direction of a vertical reference line when the head restraint is in a retracted lower position.

DE 10 2004 034 158 A1 discloses a head restraint for a vehicle seat which is movable between a usage position and a non-usage position, the head restraint affording the vehicle occupant an unrestricted view to the rear when in the non-usage position. In the non-usage position the head restraint constitutes an interfering outline in front of the seat back, thus forcing a vehicle occupant seated on the vehicle seat to move the head restraint into the usage position in order for the vehicle seat to be used comfortably.

DE 10 2004 018 964 B3 discloses an arrangement for a head restraint which can be folded down from a supporting position to a folded position. A supporting section is pivotably attached to a base section in such a way that the upholstered supporting section, when in the folded position, does not or not significantly protrude beyond the base section.

DE 10 2004 027 385 A1, DE 10 2006 003 881 A1, DE 10 2004 040 882 B3 and DE 10 2004 040 883 B3 disclose further arrangements for head restraints.

SUMMARY

The object of the present invention is to provide an improved vehicle seat comprising a head restraint and a seat back, which seat back prevents injury to a vehicle occupant in accidents.

The object is achieved according to the invention by a vehicle seat comprising a head restraint and a seat back and having the characterizing features of claim 1.

Preferred embodiments of the invention are the subject matter of the dependent claims.

In a vehicle seat comprising a head restraint and a seat back, the head restraint can be moved between a usage position and a non-usage position. According to the invention, at least one interfering element is pivotably mounted inside the seat back by means of a pivoting device, wherein in the non-usage position the head restraint positions the at least one interfering element of the seat back in such a way that the interfering element forms at least one contact point with a torso of a vehicle occupant located on the vehicle seat.

As a result the vehicle occupant is induced to adjust the head restraint into a correct usage position prior to commencing travel, thus diminishing the risk of injury to the vehicle occupant, particularly to the region of the cervical spine.

A possible embodiment provides that the interfering element forms the at least one contact point by means of bulging of an upholstery of the seat back. In particular, the interfering element is covered by the upholstery and thus protected from soiling and other mechanical wear.

A further embodiment provides that the interfering element forms the at least one contact point with a predetermined maximal bulging of the upholstery after the head restraint reaches a predetermined, in particular a minimal depth of retraction corresponding to a non-usage position. When the head restraint is retracted to a depth beyond this minimal retraction depth in the non-usage position, the interfering element remains positioned in a pivoted position such that the interfering element constantly forms the maximal bulging of the upholstery.

In a preferred embodiment of the invention the seat back and the head restraint in the usage position support a first sitting position of the vehicle occupant which defines a first characteristic line. When the head restraint is positioned in the non-usage position, unrestricted vision is provided to the vehicle occupant in particular in the direction opposite to the direction of travel. In the non-usage position the contact point of the interfering element with the torso supports a second sitting position of the vehicle occupant which defines a second characteristic line. As a result of the second sitting position being unfamiliar to the vehicle occupant, the vehicle occupant is induced to move the head restraint into the usage position and thus the familiar first sitting position can be assumed for commencing travel.

In a further possible embodiment of the invention a first tilt angle between the first characteristic line and a vertical reference line is greater than a second tilt angle between the second characteristic line and the vertical reference line. The vehicle occupant in the second sitting position thus assumes an unfamiliar upright position which reminds him that the head restraint is in the non-usage position and needs to be moved into the usage position.

Preferably, a tilt angle differential between the first tilt angle and the second tilt angle is at least 10 degrees in order for the vehicle occupant to obtain a clearly noticeable indication to move the head restraint into the correct usage position for injury prevention prior to commencing travel.

In a further preferred embodiment of the invention the interfering element is pivotably mounted on the seat back. The formation of the contact point is thus achieved in a particularly simple manner.

A mounting rod of the head restraint interacts with the interfering element for the positioning of the interfering element. The positioning of the interfering element by means of the head restraint is enabled in a purely mechanical fashion. Thus a particularly reliable interaction of the head restraint with the interfering element is achieved, largely preventing malfunctions.

According to a further preferred embodiment of the invention the interfering element has a rounded outline which is used to form the contact point of the interfering element with the torso of the vehicle occupant.

Preferably an upholstery is arranged between the torso of the vehicle occupant and the interfering element in order to extensively guarantee the comfort of the vehicle occupant in the first sitting position with the head restraint being positioned in the usage position.

Furthermore it is preferred that at least two interfering elements arranged in parallel to one another form at least two contact points. This achieves that the vehicle occupant is reminded by the interfering elements to move the head restraint into the usage position even when a sitting position is assumed that is off center or laterally offset.

According to a further possible embodiment of the invention the head restraint is lockable in the usage position. In this context an upper dimension of the head restraint in the usage position is located at a presetable vertical distance in a vertical direction from a hip point. The hip point is where the vertical reference line, the first characteristic line of the first sitting position and the second characteristic line of the second sitting position intersect. The locking of the head restraint at a presetable vertical distance enables an advantageous adjustment of the height of the head restraint according to the body size of the vehicle occupant, such that injuries in particular to the cervical spine are largely preventable.

DRAWINGS

Figure 2:
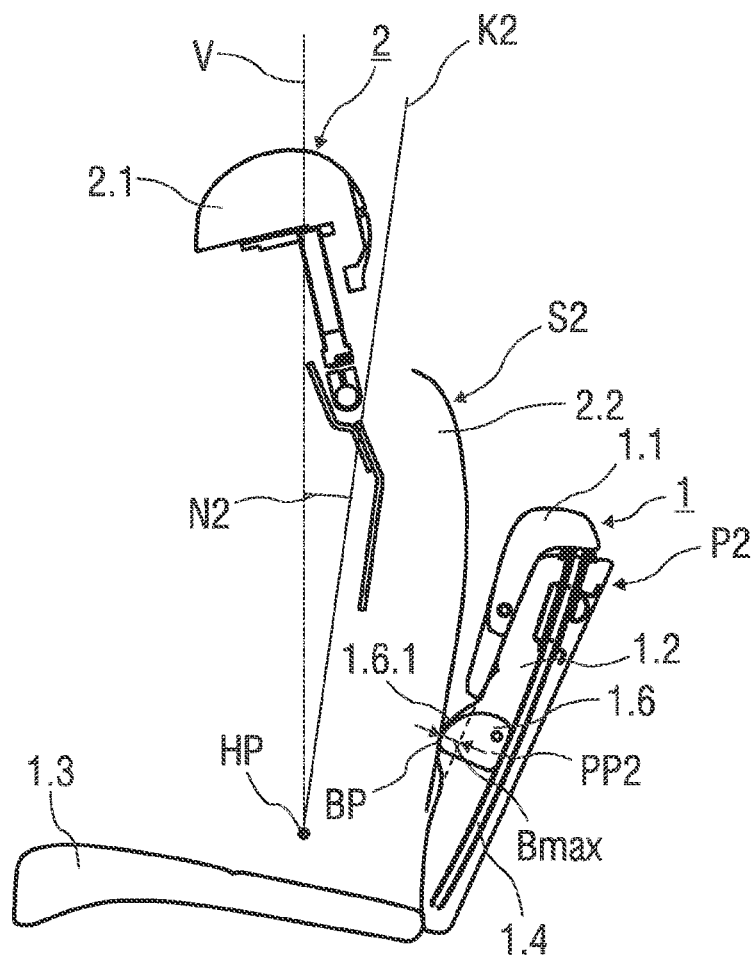
Figure 3:
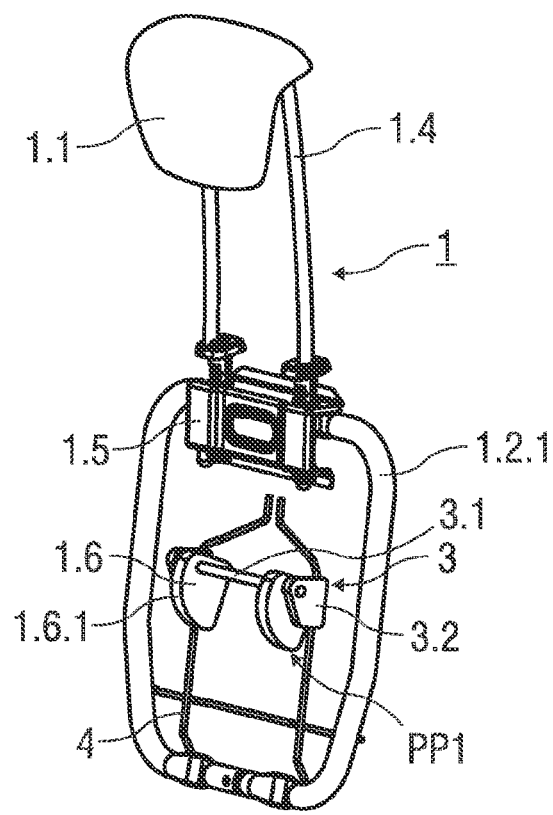
Figure 4:
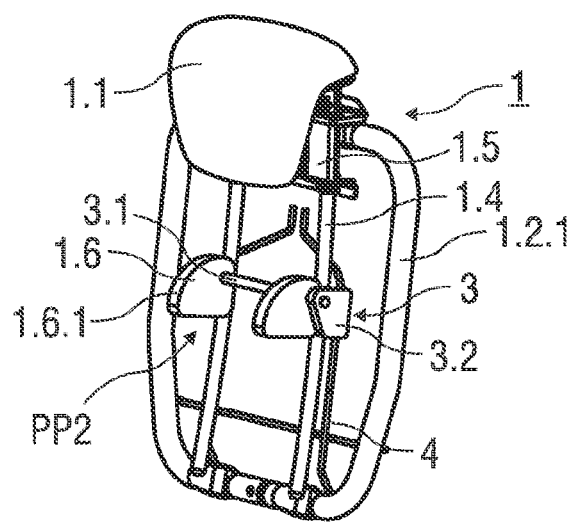

The invention is described in more detail by means of the attached schematic figures showing:

FIG. 1 a schematic cross section of a vehicle seat with a head restraint in a usage position, FIG. 2 a schematic cross section of a vehicle seat with a head restraint in a non-usage position, FIG. 3 a perspective view of a head restraint and a seat back without upholstery, the head restraint being arranged in a usage position, FIG. 4 a perspective view of a head restraint and a seat back without upholstery, the head restraint being arranged in a non-usage position.

DETAILED DESCRIPTION

Identical parts are shown with the same reference signs in all figures.

FIG. 1 shows a schematic cross section of a vehicle seat 1 with a head restraint 1.1, a seat back 1.2 and a seat cushion part 1.3. The head restraint 1.1 is locked in a usage position P1 in which the head restraint 1.1 is at a vertical distance from the seat back 1.2.

The head restraint 1.1 is connected to seat back 1.2 by means of mounting rods 1.4, an essentially vertical distance A between seat back 1.2 and head restraint 1.1 being adjustable. A locking device 1.5, which in particular can enter into a latching connection with the mounting rod 1.4, is provided for locking the head restraint 1.1 in the usage position P1.

An interfering element 1.6 is arranged beneath the upholstery of the seat back 1.2, which interfering element has a rounded outline 1.6.1 and is pivotable about an axis running perpendicular to the illustrated sectional plane. When the head restraint 1.1 is positioned in the usage position P1 the interfering element 1.6 is in a folded first position PP1. In the first position PP1 the interfering element 1.6 does not project beyond the surface plane of the seat back 1.2, but is retracted into the seat back 1.2 such that the vehicle occupant can assume a familiar position on the vehicle seat 1.

In other words: The interfering element 1.6 is located within the seat back 1.2 and covered by an upholstery of the seat back 1.2.

A mannequin 2 which comprises a head bowl 2.1 and a torso 2.2 is located on the vehicle seat 1. The mannequin 2 represents the posture of a vehicle occupant in a first sitting position S1. The head restraint 1.1 and the seat back 1.2 are in contact with the torso 2.1 at multiple points, such that the first sitting position S1 is supported by the seat back 1.2 and the head restraint 1.1. Here the posture of the vehicle occupant in the first sitting position S1 defines a first characteristic line K1 which essentially reflects the spatial orientation of the body of the vehicle occupant with reference to a vertical reference line V.

The first characteristic line K1 and the vertical reference line V intersect at a hip point HP which is located at hip level of the mannequin 2 positioned on the vehicle seat 1. The first characteristic line K1 forms a first tilt angle N1 with the vertical reference line V.

The head restraint 1.1 is lockable in the usage position P1 in such a way that a vertical distance A parallel to the vertical reference line V of an upper dimension 1.1.1 of the head restraint 1.1 in the usage position P1 to the hip point HP can be preset.

In a preferred embodiment the presetable vertical distance A is at least 750 mm.

The interfering element 1.6 and the head restraint 1.1 with the mounting rod 1.4 are arranged relative to one another in such a way on the seat back 1.2 that the interfering element 1.6 in its pivoted position (broken lines in FIG. 1 and solid lines in FIG. 2) forms at least one contact point BP with a predetermined maximal bulging Bmax of the upholstery (shown in more detail in FIG. 2) after the head restraint 1.1 reaches a predetermined, in particular a minimal depth of retraction T corresponding to a non-usage position. In the case of retraction depths of the head restraint 1.1 beyond said minimal depth of retraction T, the interfering element 1.6 remains in the pivoted position and thus in the pivoted state in which the interfering element 1.6 constantly forms the maximal bulging Bmax of the upholstery.

FIG. 2 shows a schematic cross section of the vehicle seat 1 with the head restraint 1.1 in a non-usage position P2. In the non-usage position P2 the head restraint 1.1 is retracted and projects from the seat back 1.2 only insignificantly in a vertical direction.

The mounting rod 1.4 is essentially fully retracted into the seat back 1.2 when the head restraint 1.1 is in the non-usage position P2. The mounting rod 1.4 then laterally abuts the interfering element 1.6 in such a way that the interfering element 1.6 is pivoted about the axis running perpendicular to the illustrated sectional plane and is arranged in a second position PP2. In the second position PP2, the rounded outline 1.6.1 of the interfering element 1.6 projects beyond the seat back 1.2 such that at least one contact point BP with the torso 2.2 of the mannequin 2 is formed, wherein an upholstery of the seat back 1.2 is arranged, in a manner not shown in any more detail, between the torso 2.2 and the interfering element 1.6.

The mannequin 2 shown in FIG. 2 represents the posture of a vehicle occupant who assumes a second sitting position S2 because of the contact point BP of the interfering element 1.6 with the torso 2.2. The second sitting position 2.2 essentially defines a second characteristic line K2 which indicates the orientation of the body of the vehicle occupant with reference to the vertical reference line V. The vertical reference line V and the second characteristic line K2 intersect in the common hip point HP. The second characteristic line K2 forms a second tilt angle N2 with the vertical reference line V.

In comparison to the first characteristic line K1, the second characteristic line K2 is tilted in the direction of the vertical reference line V. The second tilt angle is smaller than the first tilt angle N1. In the second sitting position S2 the vehicle occupant thus assumes a posture which is upright in comparison to the first sitting position S1. To enable a better comparison between the first and second characteristic line K1, K2, the second characteristic line K2 is additionally shown in FIG. 1.

In a preferred embodiment of the invention, the tilt angle differential ΔN between the first and second tilt angle N1, N2 is at least 10 degrees.

Furthermore, FIG. 2 shows the interfering element 1.6 in the pivoted state in which the interfering element 1.6 forms the at least one contact point BP by means of bulging of the upholstery of the seat back 1.2.

Both when the minimal depth of retraction T is reached and at retraction depths of the head restraint 1.1 beyond the depth of retraction T, the interfering element 1.6 remains in the pivoted position and thus in the pivoted state in which the interfering element 1.6 constantly forms the maximal bulging Bmax of the upholstery, by means of which a vehicle occupant sitting on the vehicle seat 1 is induced to move the head restraint 1.1 to the usage position P1.

FIG. 3 shows a perspective view of the head restraint 1.1 and the seat back 1.2 without upholstery. The head restraint 1.1 is locked into the usage position P1 by means of the locking device 1.5.

The seat back 1.2 has a circumferential seat back frame 1.2.1. Two interfering elements 1.6 arranged parallel to one another are pivotably mounted with reference to the seat back 1.2 by means of a pivot device 3. The pivot device 3 comprises a pivot axis 3.1 to which the interfering elements 1.6 are connected, and a side element 3.2. The pivot device 3 is affixed to the seat back frame 1.2.1 by means of wire-shaped or tubular mounting elements 4. In addition, traditional force-fitting, form-fitting and/or substance-to-substance connections, for example riveted, screwed and/or welded connections are used.

Preferably, the seat back frame 1.2.1 and the mounting element 4 are made of a metal. Alternatively, the seat back frame 1.2.1 and/or the mounting element 4 can be made of a polymer material.

FIG. 4 shows a perspective view of the head restraint 1.1 with upholstery and the seat back 1.2 without upholstery. The head restraint 1.1 is positioned in the non-usage position P2 by means of the locking device 1.5. Each of the two mounting rods 1.4 laterally abuts a respective interfering element 1.6 and thus positions the interfering element 1.6 in the second position PP2 in which the interfering element 1.6 projects in a direction perpendicular to the vertical reference line V. Each of the two interfering elements 1.6 forms a contact point BP with the torso 2.2 of the vehicle occupant.

The invention claimed is:

1. A vehicle seat comprising a head restraint and a seat back, the head restraint being movable between a usage position and a non-usage position, wherein at least one interfering element is pivotably mounted inside the seat back by a pivoting device, and wherein in the non-usage position the head restraint positions the at least one interfering element of the seat back in a pivoted position via engagement of a mounting rod of the head restraint with the at least one interfering element such that the at least one interfering element forms at least one contact point with the torso of a vehicle occupant located on the vehicle seat;

wherein a pivot axis of the pivoting device is positioned forward of a path of travel of the mounting rod, the at least one interfering element forms the at least one contact point with a predetermined maximal bulging of an upholstery covering the seat back after the head restraint reaches a predetermined minimal depth of refraction, and in the case of refraction depths of the head restraint beyond the minimal depth of refraction, the at least one interfering element remains in the pivoted position.

2. The vehicle seat as claimed in claim 1, wherein the seat back and the head restraint in the usage position support a first sitting position of the vehicle occupant which defines a first characteristic line, and the at least one contact point with the torso supports a second sitting position of the vehicle occupant which defines a second characteristic line.

3. The vehicle seat as claimed in claim 2, wherein a first tilt angle between the first characteristic line and a vertical reference line is greater than a second tilt angle between the second characteristic line and the vertical reference line.

4. The vehicle seat as claimed in claim 3, wherein a tilt angle differential between first tilt angle and second tilt angle is at least 10 degrees.

5. The vehicle seat as claimed in claim 1, wherein the at least one interfering element has a rounded outline.

6. The vehicle seat as claimed in claim 1, wherein at least two interfering elements arranged in parallel to one another form at least two contact points.

7. The vehicle seat as claimed in claim 2, wherein the head restraint is lockable in the usage position, and wherein an upper dimension of the head restraint in the usage position is at a presetable vertical distance from a hip point in which a vertical reference line, the first characteristic line, and the second characteristic line intersect.

* * * * *

UNITED STATES PATENT AND TRADEMARK OFFICE
CERTIFICATE OF CORRECTION

PATENT NO.        : 9,132,757 B2
APPLICATION NO.   : 13/819324
DATED             : September 15, 2015
INVENTOR(S)       : Peter Volanek et al.

Page 1 of 1

It is certified that error appears in the above-identified patent and that said Letters Patent is hereby corrected as shown below:

On the Title page, in item (75), Inventors, for John McKenna, delete "(SK)" and insert --(GB)--.

On the Title page, in item (75), Inventors, for Jan Stransky, delete "Banove n.B." and insert --Banovce n.B.--.

Signed and Sealed this
Fifth Day of July, 2016

Michelle K. Lee
*Director of the United States Patent and Trademark Office*